US009338828B2

(12) United States Patent
McGuffey

(10) Patent No.: US 9,338,828 B2
(45) Date of Patent: May 10, 2016

(54) FOAM HEAT EXCHANGER FOR HOT MELT ADHESIVE OR OTHER THERMOPLASTIC MATERIAL DISPENSING APPARATUS

(71) Applicant: Grant McGuffey, Springfield, TN (US)

(72) Inventor: Grant McGuffey, Springfield, TN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 129 days.

(21) Appl. No.: 13/633,831

(22) Filed: Oct. 2, 2012

(65) Prior Publication Data

US 2014/0093227 A1 Apr. 3, 2014

(51) Int. Cl.
*A47J 31/00* (2006.01)
*H05B 3/78* (2006.01)
*H05B 3/16* (2006.01)

(52) U.S. Cl.
CPC ............ *H05B 3/16* (2013.01); *H05B 2203/022* (2013.01)

(58) Field of Classification Search
None
See application file for complete search history.

(56) References Cited

U.S. PATENT DOCUMENTS 3,459,924 A * 8/1969 McMichael ................... 219/543
3,678,249 A * 7/1972 Lennox ......................... 219/544
3,688,083 A * 8/1972 Rice et al. ..................... 392/488
3,833,791 A * 9/1974 Schladitz ...................... 392/485
3,934,117 A * 1/1976 Schladitz ...................... 392/488
3,943,330 A * 3/1976 Pollock et al. ................ 392/387
4,220,846 A * 9/1980 Rice et al. ..................... 392/488
4,526,732 A * 7/1985 Kakii et al. .................... 264/2.7
4,725,715 A * 2/1988 Salinier et al. ................ 392/473
4,813,231 A * 3/1989 Bykowski ....................... 60/274
4,911,894 A * 3/1990 Retallick et al. .............. 422/174
4,975,559 A * 12/1990 Frisch ........................... 392/449
5,007,238 A * 4/1991 Seko ............................... 60/309
5,058,196 A * 10/1991 Nakamura et al. ............ 392/435
5,076,469 A 12/1991 Pleuse et al.
5,117,482 A * 5/1992 Hauber ......................... 392/492
5,175,996 A * 1/1993 Smith .......................... 60/203.1
5,178,651 A * 1/1993 Balma et al. ...................... 95/10
5,267,584 A * 12/1993 Smith ............................. 137/13
5,271,087 A * 12/1993 Schmid ......................... 392/485
5,507,103 A * 4/1996 Merritt .............................. 34/97
5,764,850 A * 6/1998 Olstad et al. .................. 392/485
5,963,709 A * 10/1999 Staples et al. ................. 392/488
6,282,371 B1 * 8/2001 Martin et al. ................. 392/490
6,363,217 B1 * 3/2002 Walz et al. .................... 392/485

(Continued)

FOREIGN PATENT DOCUMENTS

DE 8604711 6/1987
DE 8813693 12/1988

(Continued)

*Primary Examiner* — Thor Campbell
(74) *Attorney, Agent, or Firm* — Law Offices of Steven W. Weinrieb

(57) ABSTRACT

A foam heat exchanger, for use in connection with hot melt adhesive or other thermoplastic material dispensing applicators, comprises a foam having an open cell reticulated foam structure. Due to the open cell reticulated structure of the foam, the surface area of the foam heat exchanger, with which the air comes into contact, is significantly increased. In addition, the open cell reticulated structure of the foam heat exchanger will also cause the air flow to experience resistance and turbulence so as to in turn enhance the heating efficiency of the heat exchanger, through means of enhanced thermal energy transfer from the heat exchanger to the processed air stream, whereby a significantly larger volume of air can be heated as compared to a conventional heat exchanger of similar size.

21 Claims, 5 Drawing Sheets

(56) References Cited

U.S. PATENT DOCUMENTS

| | | | | |
|---|---|---|---|---|
| 6,532,339 | B1 * | 3/2003 | Edgar et al. | 392/490 |
| 6,931,204 | B2 * | 8/2005 | Urata et al. | 392/441 |
| 7,083,663 | B2 * | 8/2006 | Shih et al. | 95/283 |
| 7,221,859 | B2 * | 5/2007 | Stumphauzer et al. | 392/473 |
| 7,623,772 | B2 * | 11/2009 | Stumphauzer et al. | 392/473 |
| 8,027,574 | B2 * | 9/2011 | Long et al. | 392/386 |
| 8,042,498 | B2 * | 10/2011 | Hirayama et al. | 122/476 |
| 2008/0191391 | A1 * | 8/2008 | Lasko | 264/431 |

FOREIGN PATENT DOCUMENTS

| | | |
|---|---|---|
| DE | 20003637 | 7/2000 |
| JP | 2000070818 | 3/2000 |

* cited by examiner

FOAM HEAT EXCHANGER FOR HOT MELT ADHESIVE OR OTHER THERMOPLASTIC MATERIAL DISPENSING APPARATUS

CROSS REFERENCE TO RELATED PATENT APPLICATIONS

This patent application is related to, based upon, and effectively a utility/non-provisional patent application conversion from U.S. Provisional Patent Application Ser. No. 61/630,337 which was filed on Dec. 9, 2011, the filing date benefits of which are hereby claimed.

FIELD OF THE INVENTION

The present invention relates generally to heating apparatus for use in connection with hot melt adhesive or other thermoplastic material dispensing applicators, and more particularly to a new and improved foam heat exchanger for heating the incoming air to be conducted toward the hot melt adhesive or other thermoplastic material dispensing applicator output devices in order to effectively carry the hot melt adhesive or other thermoplastic material out from the dispensing nozzle of the applicator output devices and onto an underlying substrate or product, as well as to render and maintain the hot melt adhesive or other thermoplastic material sufficiently hot, sticky, and fluid or fluidic, such that the hot melt adhesive or other thermoplastic material can in fact be properly dispensed from the nozzles of the applicator output devices onto the underlying substrate or product.

BACKGROUND OF THE INVENTION

In connection with hot melt adhesive or other thermoplastic material dispensing applicator apparatus, wherein the hot melt adhesive or other thermoplastic material is to be sprayed or otherwise dispensed and deposited onto an underlying substrate or product as the substrate or product passes beneath the dispensing valves of the applicators along a product processing line during a hot melt adhesive or other thermoplastic material dispensing application operation or cycle, compressed air is initially conducted into an intake air manifold. This air then needs to be heated and conducted along a passageway which is fluidically connected to the applicator output devices so as to in fact, not only carry the hot melt adhesive or other thermoplastic material out from the dispensing nozzle and onto the underlying substrate or product, but in addition, to heat the hot melt adhesive or other thermoplastic material, to be dispensed, to a predetermined temperature level at which the hot melt adhesive or other thermoplastic material will effectively be rendered sufficiently hot, sticky, and fluid or fluidic so as to in fact be capable of being sprayed or otherwise dispensed onto the underlying substrate or product. Conventionally, the means utilized for the aforenoted heating of the hot melt adhesive or other thermoplastic materials has comprised a suitable heat exchanger. However, conventional heat exchangers have structural limitations. For example, some conventional heat exchangers have baffles and/or machined surfaces incorporated into the heat exchanger structure so as to effectively increase the total surface area of the heat exchanger with which the air, to be heated, will come into contact and be heated thereby. Unfortunately, the surface area of such heat exchangers can only be increased to a certain degree by such structural modifications. In addition, as the number of baffles and/or machined surfaces has been increased, the complexity and manufacturing costs of the heat exchangers become significant factors to be considered from a commercial point of view.

A need therefore exists in the art for a new and improved heat exchanger, for use in connection with hot melt adhesive or other thermoplastic material dispensing applicators, wherein the effective surface area of the heat exchanger is significantly increased so as to enhance the heating efficiency of the heat exchanger, with respect to the air to be heated, such that a greater volume of air can be heated without correspondingly adversely affecting the complexity and manufacturing cost of the heat exchanger.

SUMMARY OF THE INVENTION

The foregoing and other objectives are achieved in accordance with the teachings and principles of the present invention through the provision of a new and improved foam heat exchanger for use in connection with hot melt adhesive or other thermoplastic material dispensing applicators. More particularly, the foam heat exchanger comprises a foam having an open cell reticulated foam structure. Further still, each cell of the reticulated foam structure may comprise a geometrical configuration which is that of a tetrakaidecahedron. The foam structure may be fabricated from a suitable metal, such as, for example, aluminum, silicon carbide, or copper, or alternatively, the foam structure may be fabricated as a carbon foam structure or as a ceramic foam structure. As can be readily appreciated, due to the open cell reticulated structure of the foam, the surface area of the foam heat exchanger, with which the air comes into contact, is significantly increased. In addition, the open cell reticulated structure of the foam will also cause the air flow to experience resistance and turbulence so as to in turn enhance the heating efficiency of the heat exchanger, through means of enhanced thermal energy transfer from the heat exchanger to the processed air stream, whereby a significantly larger volume of air can be heated as compared to a conventional heat exchanger of similar size.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 1:
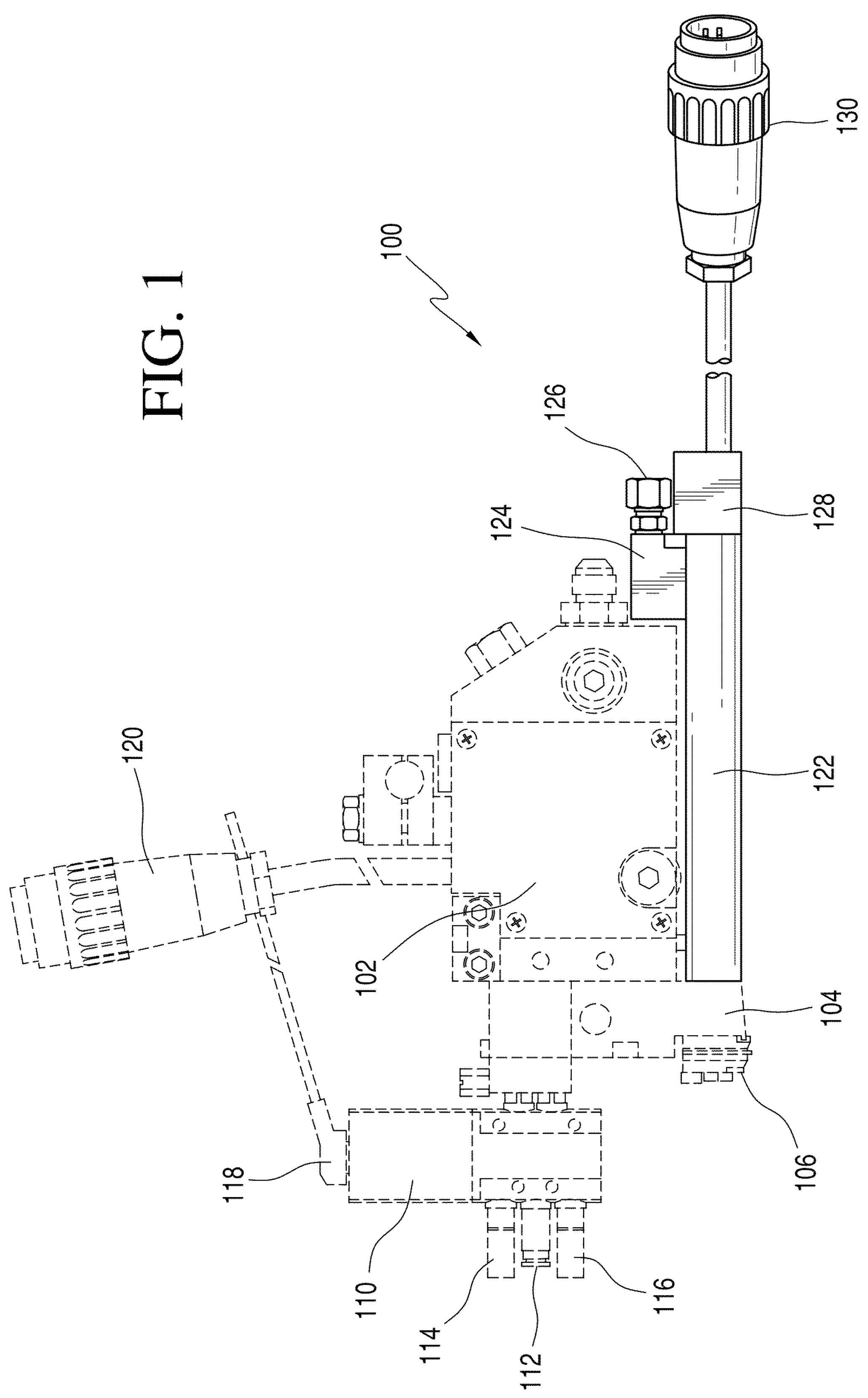
FIG. 1 is a side elevational view of a hot melt adhesive or other thermoplastic material dispensing application within which the new and improved foam heat exchanger of the present invention is incorporated.

Referring now to the drawings, and more particularly to FIG. 1 thereof, a hot melt adhesive or other thermoplastic material dispensing applicator assembly is illustrated and is generally indicated by the reference character 100. More particularly, the hot melt adhesive or other thermoplastic material dispensing applicator assembly 100 is seen to comprise a pressurized spray applicator 102 to which there is fixedly secured a hot melt adhesive or other thermoplastic material output device 104 which includes a dispensing nozzle 106 from which the hot melt adhesive or other thermoplastic material is actually dispensed as shown at 108 in FIG. 2. As is well known, the hot melt adhesive or other thermoplastic output device 104 comprises a vertically reciprocating dispensing control valve, not shown, and a solenoid control valve assembly 110 is operatively associated with the vertically reciprocating dispensing control valve, not shown, so as to control the disposition of the dispensing control valve, not shown, between its open and closed positions. The solenoid control valve assembly 110 is provided with a control air input fitting 112, and a pair of control air output fitting 114, 116 as is also well known, the control air controlling the vertical disposition of the dispensing control valve, not shown. An electrical connector 118 is fixedly secured atop the solenoid control valve assembly 110 so as to supply electrical power to the solenoid control valve assembly 110. In addition, another electrical connector 120 is likewise fixedly secured to the pressurized spray applicator 102 so as to supply electrical power to heaters, not shown, disposed within the pressurized spray applicator 102, such that the temperature zone within the pressurized spray applicator 102, through which the hot melt adhesive or other thermoplastic material is conveyed, is maintained at a predetermined temperature level.

With reference continuing to be made to FIG. 1, and with additional reference being made to FIG. 2, the description of the new and improved foam heat exchanger assembly of the present invention will now be described. More particularly, it is seen that the new and improved foam heat exchanger assembly comprises a heat exchanger body 122 which is disposed beneath the pressurized spray applicator 102 and is in abutment with an underside portion thereof, and in addition, a downstream end portion of the heat exchanger body 122 is also disposed in abutment with the hot melt adhesive or other thermoplastic material output device 104. The upstream end portion of the heat exchanger body 122 has an inlet air manifold 124 mounted upon an upper surface portion thereof, while an inlet air fitting 126 is operatively and fluidically connected to the inlet air manifold 124. The inlet air fitting 126 is adapted to receive a supply of pressurized air, as noted at IN, in FIG. 2, which is to be heated by means of the new and improved heat exchanger assembly of the present invention. In addition, an electrical splice or junction 128 is fixedly connected to the upstream end face of the upstream end portion of the heat exchanger body 122, and an electrical connector 130 is electrically connected to the electrical splice or junction 128 so as to supply electrical power to the electrical splice or junction 128 as will be more fully disclosed and explained.

Figure 2:
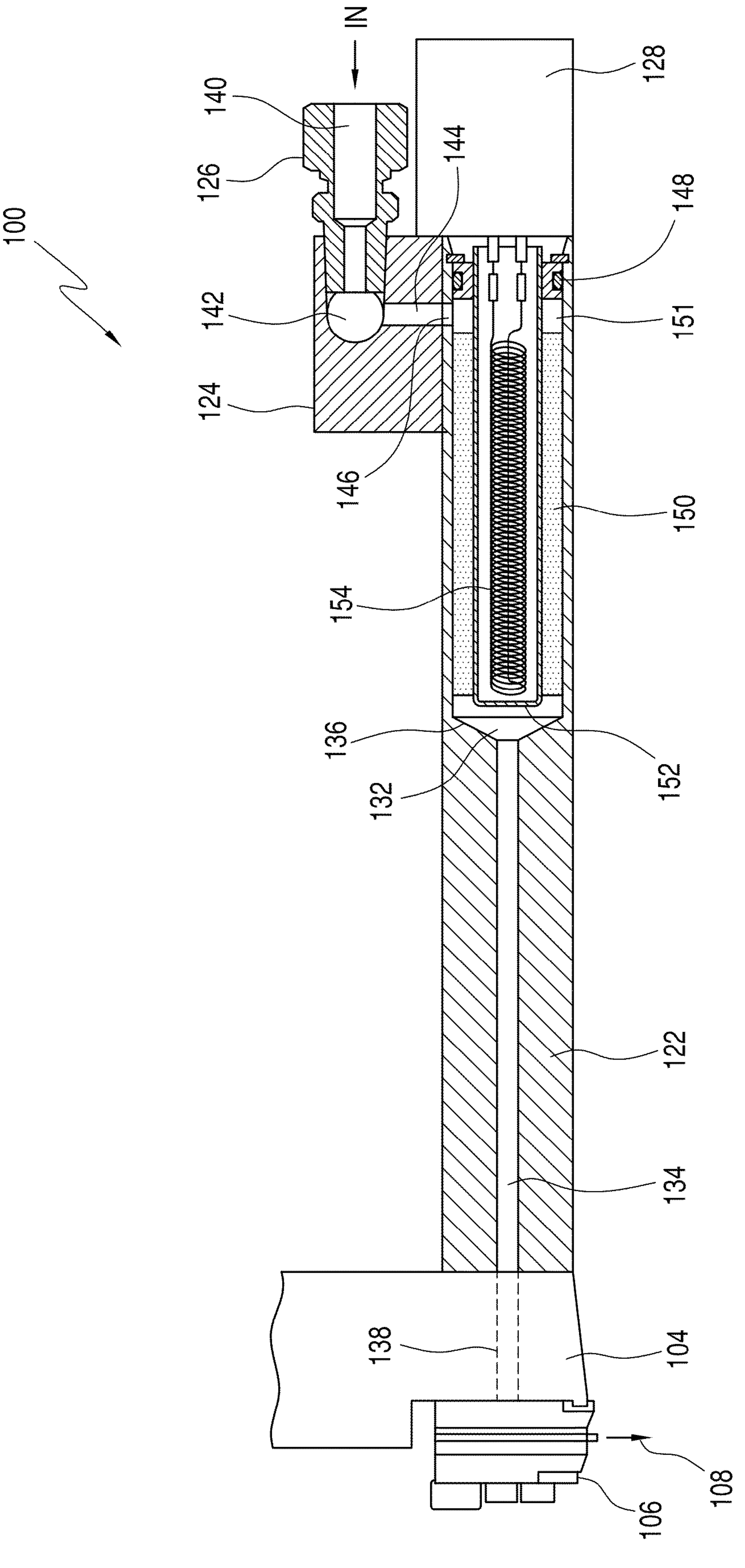
FIG. 2 is a longitudinal cross-sectional view of the new and improved new and improved foam heat exchanger assembly as constructed in accordance with the principles and teachings of the present invention and as disposed within the heat exchanger body.

With reference now being particularly made to FIG. 2, the details of the new and improved foam heat exchanger assembly will now be disclosed. More particularly, it is seen that the heat exchanger body 122 is provided with an enlarged bore 132 within the longitudinally upstream half end portion thereof, while an axially oriented fluid passageway 134 is defined within the longitudinally downstream half end portion of the heat exchanger body 122. The axially oriented fluid passageway 134 is fluidically connected at its upstream end portion to the enlarged bore 132 by means of a tapered interface or transitional section 136, and the axially oriented fluid passageway 134 is fluidically connected at its downstream end portion to an upstream end portion of an axially oriented fluid passageway 138 which is defined within the hot melt adhesive or other thermoplastic material output device 104. The downstream end portion of the axially oriented fluid passageway 138 is fluidically connected to the dispensing nozzle 106 so as to supply heated air thereto in order to not only carry the hot melt adhesive or other thermoplastic material out from the nozzle 106 and onto an underlying substrate or product, but in addition, to heat the hot melt adhesive or other thermoplastic material, to be dispensed, to a predetermined temperature level at which the hot melt adhesive or other thermoplastic material will effectively be rendered sufficiently hot, sticky, and fluid or fluidic so as to in fact be capable of being sprayed or otherwise dispensed onto the underlying substrate or product.

With reference continuing to be made to FIG. 2, it is additionally seen that the inlet air fitting 126 is adapted to be fixedly connected at its upstream end portion to a supply of compressed air, not shown, and is provided with an axially oriented fluid passageway 140. The inlet air manifold 124 is provided with a plenum chamber 142 which is fluidically connected to the downstream end portion of the axially oriented fluid passageway 140. In addition, the inlet air manifold 124 is also provided with a fluid passageway 144 which is oriented perpendicularly or orthogonally with respect to the axially oriented fluid passageway 140. An upstream end portion of the fluid passageway 144 is fluidically connected to the plenum chamber 142, while a side wall portion of the heat exchanger body 122 is provided with an aperture 146 which is aligned with, and fluidically connected to, the downstream end portion of the fluid passageway 144. Accordingly, the upstream end portion of the internal enlarged bore 132 of the heat exchanger body 122 is fluidically connected to inlet air manifold 124 and the inlet air fitting 126. It is also seen that an annular seal assembly 148 is fixedly secured within the internal enlarged bore 132 so as to be disposed adjacent to the open end portion of the heat exchanger body 122, as well as being disposed immediately adjacent to the aperture 146, so as to effectively close and seal the open end portion of the heat exchanger body 122. In addition, it is seen that a foam heat exchanger 150, which has the configuration of an elongated tubular or annular member, is also disposed within the internal enlarged bore 132 of the heat exchanger body 122. The upstream end portion of the foam heat exchanger 150 is likewise disposed immediately adjacent to the aperture 146, but on the side of the aperture 146 which is opposite the side at which the annular seal assembly 148 is located relative to the aperture 146, while the downstream end portion of the foam heat exchanger 150 is disposed within the vicinity of the tapered interface or transitional section 136 of the internal bore 132. In this manner, it can be appreciated that an annular fluid passageway 151 is defined between the annular seal assembly 148 and the upstream end portion of the foam heat exchanger 150. It is further seen that a heater coil sheath 152, in the form of an open-ended tubular member, is disposed internally within the foam heat exchanger 150 such that the external peripheral wall portion of the heater coil sheath 152 is disposed in contact with the internal peripheral surface of the foam heat exchanger 150. Still further, a heater coil 154, in the form of an axially elongated coil member, is disposed in a coaxial manner internally within the heater coil sheath 152 and with respect to the foam heat exchanger.

Figure 3:
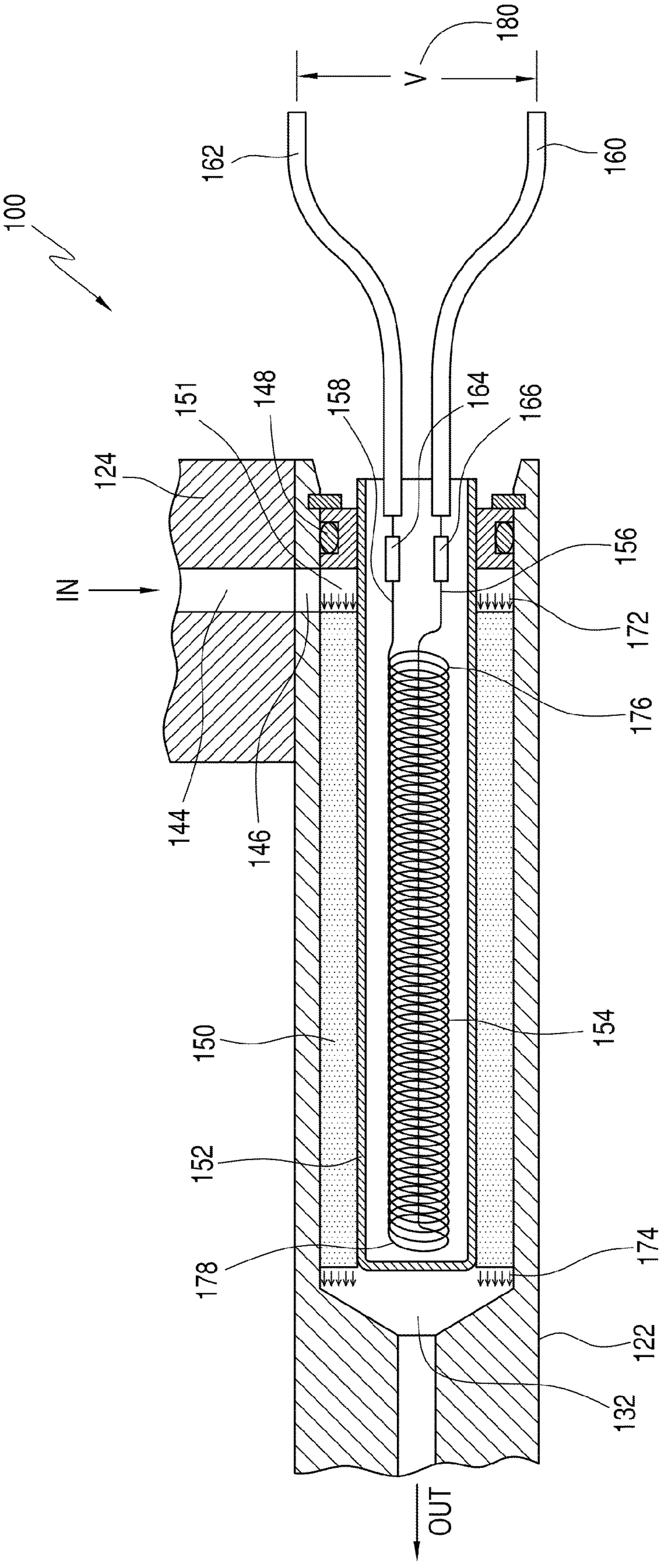
FIG. 3 is an enlarged longitudinal cross-sectional view of the new and improved foam heat exchanger assembly, as disclosed within FIG. 2, showing the details of the heat exchanger coil, the electrical connections to the heat exchanger coil, and the disposition of the heat exchanger coil within the heat exchanger sheath in contact with which is disposed the foam heat exchanger through which the heated air is conducted.

As can also be appreciated as a result of reference being additionally made to FIG. 3, it is further seen that the free end portions of the heater coil define electrical leads 156,158, and that the electrical leads 156,158 are electrically connected to power lines or leads 160,162, coming from the electrical connector 130 and the electrical splice or junction 128, by means of electrical connectors 164,166. It is to be noted that the foam heat exchanger 150 is fabricated from an initially closed-cell type foam structure, and through means of a known bubbling process, the closed cell foam structure is effectively converted into an open cell reticulated foam structure wherein the reticulated cells have the configuration of a tetrakaidecahedron. The foam exchanger 150 may be fabricated from any one of various suitable metal elements, such as, for example, aluminum, silicon carbide, or copper, or alternatively, the foam heat exchanger may be fabricated from carbon or a suitable ceramic material.

Figure 4:
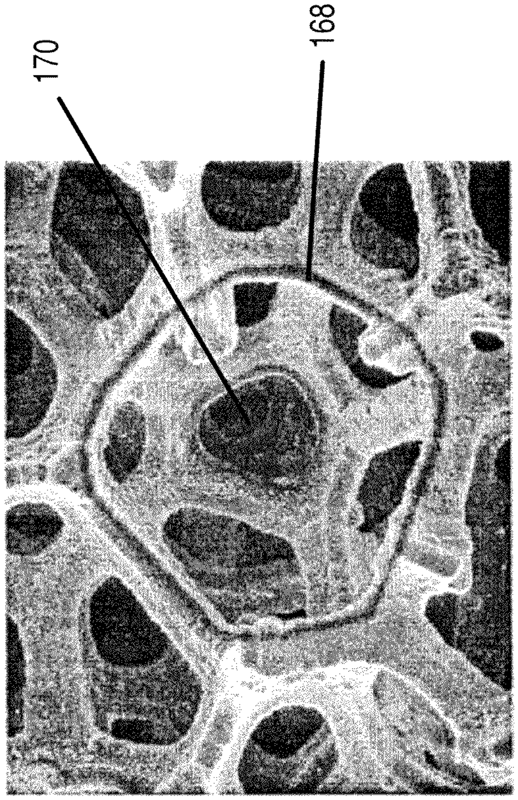
FIG. 4 is a pictorial view of a section of the reticulated tetrakaidecahedron foam comprising the foam heat exchanger, as provided by means of a scanning electron microscope, showing the internal structure and the relationship that exists between the open cells and pores created by the natural structure of the foam.

As a result of such open cell reticulated foam structure characteristic of foam heat exchanger 150, cells 168 and pores 170 of the foam heat exchanger, as disclosed within the photograph of FIG. 4, will, as has been noted hereinbefore, significantly enhance the surface area characteristic of the foam heat exchange 150. In addition, and again, due to the open cell reticulated foam structure characteristic of the foam heat exchanger 150, the air flow, conducted through the cells and pores 168,170 of the metallic foam heat exchanger 150, will encounter resistance and serve to cause turbulence within the air flow. This turbulence will, in turn, cause a significant amount of mixing to occur within the air flow, will prevent laminar flow conditions from occurring within the air flow, and will cause the thermal energy and heat, imparted to the air flow by means of the heater coil 154 and the heater coil sheath 152 disposed in contact with the inner peripheral wall surface of the foam heat exchanger 150, to be uniformly distributed throughout the air flow. It is to be noted that the cells 168 define, for example, the reticulated tetrakaidecahedron structure of the metallic foam heat exchanger 150, while the pores 170 effectively define vacancies or openings between adjacent ones of the cells 168. A commercial example of such a foam is known and sold under the trademark DUOCEL®.

As a result of the aforenoted flow of air through the foam heat exchanger 150 from the air inlet passageways 144,146, 151 at the air inlet end of the foam heat exchanger 150, to the air outlet end 132 of the foam heat exchanger 150, a pressure gradient, or a pressure drop, exists across the longitudinal extent of the foam heat exchanger 150. More particularly, the air pressure of the compressed air being supplied to the foam heat exchanger 150 through means of the inlet air fitting 126 and the inlet air manifold 124 may be, for example, 100 PSI. The air pressure within the downstream or outlet end of the enlarged bore 132 may be, for example, 30 PSI, that is, there may be a pressure gradient, or a pressure drop, of approximately 70 PSI. The high pressure air, disposed within the upstream or inlet air end of the foam heat exchanger 150, as schematically illustrated at 172 within FIG. 3, will therefore be more compressed and denser than the low pressure air, disposed within the downstream or outlet air end of the foam heat exchanger 150, as schematically illustrated at 174 within FIG. 3. The molecules of the relatively high-density air, disposed within the upstream or air inlet end of the foam heat exchanger 150, will effectively be packed closer together with respect to each other and thereby able to transfer thermal or heat energy much more efficiently with respect to each other than will be characteristic of the molecules of the less dense air disposed within the downstream or air outlet end of the metallic foam heat exchanger 150, wherein, due to the lower pressure characteristic of such outlet air, the molecules of air will effectively be located further apart from each other. Therefore, in order to most effectively, and most efficiently, heat the inlet air, which is being supplied to the air inlet passageways 144,146,151 at the air inlet end of the foam heat exchanger 150, and which will be conducted through the annular space defined by means of the foam heat exchanger 150 such that the heated air can reach the downstream or outlet end portion of the enlarged bore 132 and thereby be conducted through the fluid passageways 134,138 and into the dispensing nozzle 106, it is advantageous to effectively construct the heater coil 154 in such a manner that the density of the heater coil 154 is greater at the upstream end portion thereof, as schematically illustrated within FIG. 3 at 176, than at the downstream end portion of the heater coil 154 as schematically illustrated at 178 with-in FIG. 3. In this manner, the larger or greater amount of thermal energy or heat, generated by means of the more densely constructed upstream end portion 176 of the heater coil 154, will be able to more efficiently heat, and effectively transfer, its thermal energy to the more dense inlet air 172 disposed adjacent to, and entering, the air inlet end portion of the foam heat exchanger 150.

The heater coil 154 is a resistive type heater that effectively converts electrical energy into thermal energy, wherein the total amount of thermal energy or generated power produced by means of the heater coil 154 is determined by the resistance of the heater coil 154, and the amount of voltage V, schematically illustrated within FIG. 3 at 180, which is applied across the electrical leads 160,162 and which will, of course, be transmitted to the leads 156,158 of the heater coil 154. According to Ohm's Law, $$I=V/R$$

wherein the electrical current I can be calculated from the known voltage V and the resistance R, and from the well-known power equation, we know that power is equal to the electrical current multiplied by the applied voltage, or $$P=IV$$

Therefore, if one substitutes V/R, from Ohm's Law, for the I in the power equation, we can derive the power P as being $V^2/R$. Accordingly, if, for example, the applied voltage V=240 volts, and the resistance of the heater coil 154 is 288 ohms, the power or thermal energy generated by the heater coil 154 will be 200 watts. However, since the thermal energy actually applied or transferred to the air flow will decrease due to the aforenoted pressure drop or pressure gradient characteristic of the air flow along the longitudinal extent of the foam heat exchanger 150, the individual coils of the heater coil 154 are wound with a tighter or greater density at the upstream end portion of the heater coil 154 than at the downstream end portion of the heater coil 154 in a manner proportional to the pressure drop which exists along the longitudinal extent of the foam heat exchanger 110. In this manner, the heater coil 154 can cause the air flow, flowing through the metallic foam heat exchanger 150, to be most effectively, and most efficiently, heated.

It is lastly to be noted that while the heater coil 154 has been structurally incorporated into the heat exchanger assembly, the heater coil 154 can in fact be eliminated whereby the electrical power is electrically supplied directly to the foam heat exchanger. The ultimate results are effectively the same with respect to the power or thermal energy generated because in a similar manner, the power or thermal energy generated will be dependent upon the voltage applied to the foam heat exchanger, and the resistance of the foam heat exchanger in accordance with the aforenoted Ohm's Law and power equation.

Figure 5:
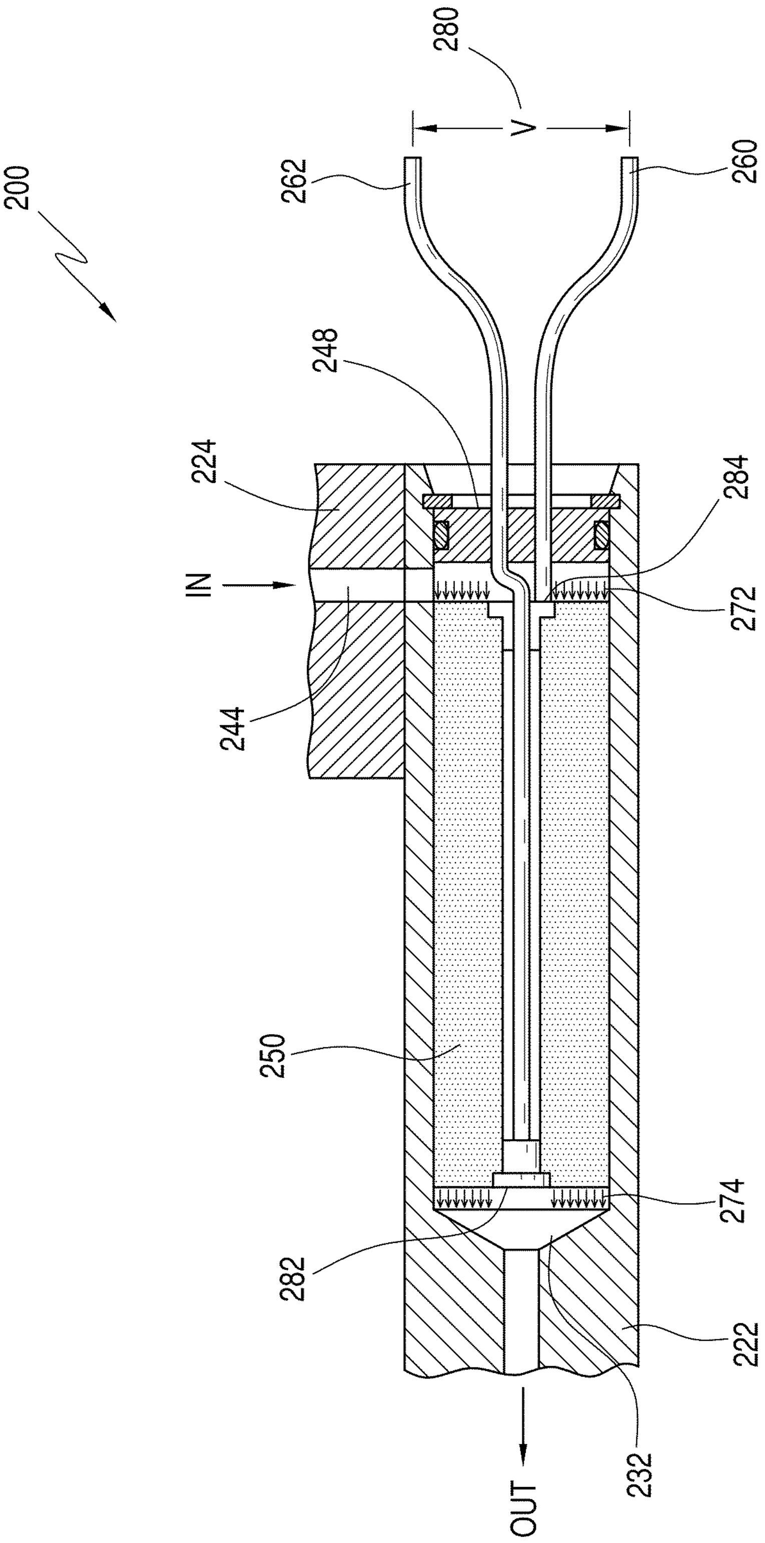
FIG. 5 is longitudinal cross-sectional view similar to FIG. 3 except that it discloses a second embodiment of the present invention wherein the electrical power supply is connected directly to the foam heat exchanger.

With reference lastly being made to FIG. 5, a second embodiment of a foam heat exchanger assembly, as constructed in accordance with the principles and teachings of the present invention is disclosed and is generally noted by the reference character 200. Component parts of the foam heat exchanger assembly 200, which correspond to those of the first embodiment foam heat exchanger assembly 100, will be designated by corresponding reference numbers except that they will be within the 200 series. More particularly, it is to be appreciated that the primary difference between the first embodiment foam heat exchanger assembly 100 and the second embodiment foam heat exchanger assembly 200 resides in the fact that the heater coil sheath 152 and the heater coil 154 have been eliminated, and that the power supply lines or leads 260,262 are now connected directly to the foam heat exchanger 250 by means of suitable electrical connectors or nodes 282,284. In this particular embodiment, it will be further appreciated that the resistive properties of the particular material from which the foam heat exchanger 250 is fabricated will determine the derived power or energy as may be calculated from the foregoing Ohm's Law and power equations. As the electrical energy passes through the foam heat exchanger, the foam heat exchanger will convert the electrical energy to heat or thermal energy which will, in turn, be used to effectively heat the air passing through the foam heat exchanger as the air traverses the foam heat exchanger from the air inlet end, schematically shown at 272, to the air outlet end schematically shown at 274.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States is:

1. A heat exchanger assembly, for use in connection with hot melt adhesive or other thermoplastic dispensing apparatus, wherein the heat ex-changer assembly will transfer thermal energy to air to be supplied to a dispensing nozzle operatively associated with the dispensing apparatus, comprising:

a heat exchanger body;

an annular foam heat exchanger disposed within said heat exchanger body;

an air inlet for supplying compressed air into an upstream end of said heat exchanger body such that said compressed air can flow through said foam heat exchanger;

an air outlet for supplying heated air out from a downstream end of said foam heat exchanger and toward a dispensing nozzle of a hot melt adhesive or other thermoplastic dispensing apparatus; and an electrical heater coil, disposed substantially coaxially within said annular foam heat exchanger wherein individual coils of said heater coil are wound with a greater density at an upstream end portion of said heater coil corresponding to said air inlet of said heat exchanger body than at a downstream end portion of said heater coil so as to compensate for a pressure drop characteristic of the air flowing through said foam heat exchanger from said air inlet to said air outlet, for causing said foam heat exchanger to be heated whereby said foam heat exchanger can, in turn, efficiently heat said compressed air as said compressed air flows through said foam heat exchanger from said air inlet to said air outlet.

2. The heat exchanger assembly as set forth in claim 1, further comprising:

a heater coil sheath interposed between said foam heat exchanger and said heater coil.

3. The heat exchanger assembly as set forth in claim 2, wherein:

said heater coil sheath comprises a tubular member.

4. The heat exchanger assembly as set forth in claim 3, wherein:

an inner peripheral surface portion of said foam heat exchanger, comprising said tubular member, is disposed in contact with an outer peripheral surface portion of said heater coil sheath comprising said tubular member.

5. The heat exchanger assembly as set forth in claim 1, wherein:

said foam heat exchanger comprises an open cell reticulated foam structure.

6. The heat exchanger assembly as set forth in claim 5, wherein:

said open cell reticulated foam structure comprises a plurality of cells having tetrakaidecahedron geometrical configurations.

7. The heat exchanger assembly as set forth in claim 1, wherein:

said foam heat exchanger is fabricated from a material selected from the group comprising a metal, carbon, and a ceramic material.

8. The heat exchanger assembly as set forth in claim 7, wherein:

said metal is selected from the group comprising aluminum, silicon carbide, and copper.

9. Hot melt adhesive or other thermoplastic dispensing apparatus, comprising:

a dispensing nozzle for dispensing hot melt adhesive or other thermo-plastic material onto an underlying substrate or product;

a heat exchanger body;

an annular foam heat exchanger disposed within said heat exchanger body;

an air inlet for supplying compressed air into an upstream end of said heat exchanger body such that said compressed air can flow through said foam heat exchanger;

an air outlet for supplying heated air out from a downstream end of said foam heat exchanger and toward said dispensing nozzle of said hot melt adhesive or other thermoplastic dispensing apparatus; and an electrical heater coil, disposed substantially coaxially within said foam heat exchanger wherein individual coils of said heater coil are wound with a greater density at an upstream end portion of said heater coil corresponding to said air inlet of said heat exchanger body than at a downstream end portion of said heater coil so as to compensate for a pressure drop characteristic of the air flowing through said foam heat exchanger from said air inlet to said air outlet, for causing said foam heat exchanger to be heated whereby said foam heat exchanger can, in turn, efficiently heat said compressed air as said compressed air flows through said foam heat exchanger from said air inlet to said air outlet.

10. The hot melt adhesive or other thermoplastic dispensing apparatus as set forth in claim 9, further comprising:

a heater coil sheath interposed between said foam heat exchanger and said heater coil.

11. The hot melt adhesive or other thermoplastic dispensing apparatus as set forth in claim 10, wherein:

said heater coil sheath comprises a tubular member.

12. The hot melt adhesive or other thermoplastic dispensing apparatus as set forth in claim 11, wherein:

an inner peripheral surface portion of said foam heat exchanger, comprising said tubular member, is disposed in contact with an outer peripheral surface portion of said heater coil sheath comprising said tubular member.

13. The hot melt adhesive or other thermoplastic dispensing apparatus as set forth in claim 9, wherein:

said foam heat exchanger comprises an open cell reticulated foam structure.

14. The hot melt adhesive or other thermoplastic dispensing apparatus as set forth in claim 13, wherein:

said open cell reticulated foam structure comprises a plurality of cells having tetrakaidecahedron geometrical configurations.

15. The hot melt adhesive or other thermoplastic dispensing apparatus as set forth in claim 9, wherein:

said foam heat exchanger is fabricated from a material selected from a metal, carbon, and a ceramic material.

16. The hot melt adhesive or other thermoplastic dispensing apparatus as set forth in claim 15, wherein:

the metal is selected from the group comprising aluminum, silicon carbide, and copper.

17. A heat exchanger assembly, for use in connection with hot melt adhesive or other thermoplastic dispensing apparatus, wherein the heat ex-changer assembly will transfer thermal energy to air to be supplied to a dispensing nozzle operatively associated with the dispensing apparatus, comprising:

a heat exchanger body;

an annular foam heat exchanger disposed within said heat exchanger body;

an air inlet for supplying compressed air into an upstream end of said heat exchanger body such that said compressed air can flow through said foam heat exchanger;

an air outlet for supplying heated air out from a downstream end of said foam heat exchanger and toward a dispensing nozzle of a hot melt adhesive or other thermoplastic dispensing apparatus; and electrical power structure comprising a first power cable operatively connected to a first upstream end portion of said foam heat exchanger and a second power cable extending substantially coaxially through said annular foam heat exchanger and operatively connected to a second downstream end portion of said foam heat exchanger for causing said foam heat exchanger to be heated whereby said foam heat exchanger can, in turn, heat said compressed air as said compressed air flows through said foam heat exchanger from said air inlet to said air outlet.

18. The heat exchanger assembly as set forth in claim 17, wherein:

said foam heat exchanger comprises an open cell reticulated foam structure.

19. The heat exchanger assembly as set forth in claim 18, wherein:

said open cell reticulated foam structure comprises a plurality of cells having tetrakaidecahedron geometrical configurations.

20. The heat exchanger assembly as set forth in claim 17, wherein:

said foam heat exchanger is fabricated from a material selected from the group comprising a metal, carbon, and a ceramic material.

21. The heat exchanger assembly as set forth in claim 20, wherein:

said metal is selected from the group comprising aluminum, silicon carbide, and copper.

* * * * *